(12) United States Patent
Bulle

(10) Patent No.: US 7,071,441 B1
(45) Date of Patent: Jul. 4, 2006

(54) CUTTING SYSTEM CONTROLS, INCLUDING HEIGHT CONTROL

(76) Inventor: Jason Bulle, P.O. Box 755, Rye, CO (US) 81069

( * ) Notice: Subject to any disclaimer, the term of this patent is extended or adjusted under 35 U.S.C. 154(b) by 108 days.

(21) Appl. No.: 10/732,681

(22) Filed: Dec. 10, 2003

(51) Int. Cl.
  *B23K 10/00* (2006.01)
(52) U.S. Cl. .................... 219/121.39; 219/121.56; 219/121.54
(58) Field of Classification Search .......... 219/121.39, 219/121.36, 121.48, 121.56, 121.44, 121.59, 219/121.54, 121.57; 700/165–178
See application file for complete search history.

(56) References Cited

U.S. PATENT DOCUMENTS 6,028,287 A * 2/2000 Passage et al. ........ 219/121.56
6,359,251 B1 * 3/2002 Picard et al. .......... 219/121.57
6,772,040 B1 * 8/2004 Picard et al. ............ 700/166

* cited by examiner

*Primary Examiner*—Mark Paschall
(74) *Attorney, Agent, or Firm*—Parsons & Goltry; Robert A. Parsons; Michael W. Goltry

(57) ABSTRACT

A cutting system is disclosed for a plasma cutting torch movable by a driver relative to a work piece along a Z-axis. During cutting, the torch provides an arc voltage proportional to a distance between the torch and the work piece. A height control feedback circuit is connected to the torch and includes sensor circuitry providing an electrical signal proportional to the arc voltage and an analog-to-digital converter for converting the proportional signal to a digital signal. A computer and controller, including controls for selecting a desired height of the plasma torch, receive the digital signal, compare the actual height to the desired height, and actuate the driver to move the torch to within a preset limit of the desired height.

27 Claims, 12 Drawing Sheets

Z Axis Motion

Z axis speed (inch/min) `60`

☑ Raise and Lower between cuts

Height for rapid travel(inch) `0.5`

Height for piece(inch) `0.1`

☑ Stall on material to set height vertravel for stall(inch) `0.1`

Material thickness(inch/ga) `0.134`

FIGURE 14

Digital Height Control

☑ Use torch height control

Cutting height (inch) `0.108`

Height tolerance(inch) `0.029`

Max climb(inch/min) `40`

Max Dive(inch/min) `20`

Climb Zone (inch) `0.057`

Dive Zone (inch) `0.076`

FIGURE 12

Arc Voltage Calibration

Arc Voltage Scale (V/inch) `5`

Arc Voltage shift (inch) `0.7`   `zero`

Minimum cutting signal (V) `3`

Maximum cutting signal (V) `12`

FIGURE 15

Time Delays

☐ Wait for cutting signal before moving    ☑ Alter Delay on successive pieces

Time spent piercing hole (sec) `0.5`    Successive pierce time (sec) `0.1`

Continuous cutting after stop(sec) `0.05`    If within time of last cut (sec) `10`

FIGURE 16

CUTTING SYSTEM CONTROLS, INCLUDING HEIGHT CONTROL

FIELD OF THE INVENTION

This invention relates to systems using a plasma torch for cutting shapes out of metal sheets and plates and more particularly to improved cutting systems incorporating height control.

BACKGROUND OF THE INVENTION

Plasma torches have been used for many years for cutting shapes from sheets of metal materials. Handheld plasma torches have been developed for quickly and efficiently cutting shapes from materials. While efficient in cutting material, handheld torches are limited in their accuracy to the skill of the operator. Some parts, such as those for artistic works may not need to be accurate. Other parts, such as those used in mechanical devices, often need to meet certain tolerances and need extreme accuracy. Extreme accuracy is not possible with a manually operated handheld plasma torch.

To overcome this problem, plasma torches have been developed which are designed specifically to be mounted to machines capable of controlling the torches horizontally along an x axis and a y axis. These machines can be programmed to cut shapes by inputting a system of coordinates. They can be highly accurate and produce identical parts. There are, however, a number of problems with these devices. Operation of these systems is very complex, requiring extensive training, programming of the device can be very time consuming, and small changes require reworking of the entire program. The systems are expensive and the torches themselves are more costly than the handheld torches. These problems reduce the economic gains achieved by having an automated system performing the cuts.

Other problems include accuracy and efficiency. While cutting a planar sheet of material would appear to require only movement of the torch horizontally along an x axis and a y axis, the sheets being cut may not be absolutely planar, or more likely, upon cutting, the heat generated can cause buckling of the material. As the cutting torch moves over the surface of the material, these irregularities can result in changes in the distance between the tip of the torch and the surface being cut. The changes in distance can adversely affect the accuracy of the cut. Furthermore, pressure on the tip can cause damage thereto or result in a stoppage. All of these problems can be costly in time, accuracy and money.

Height control of the plasma nozzle or torch above the work helps with plasma cutting because material is never perfectly flat and because the work generally warps when cutting. Plasma cutters work best when the distance of the plasma torch above the work is regulated and tightly controlled. Some early cutting machines or systems didn't include a height control at all. Some early cutting machines or systems used a height control that involved actually dragging the torch tip or nozzle across the material. The dragging action can lead to the torch hanging up more, and consumables wearing out more as compared to a strategy involving a floating height above the material.

In one prior art system, the plasma cutter simply starts moving a preset time delay after it fires the trigger of the plasma torch. This method leads to malfunctions any time the plasma torch takes more or less time to start the cut than expected. This method also causes malfunctions if the plasma torch isn't working at all, because the machine still tries to cut—not knowing that the torch isn't cutting.

Another prior art cutting system requires a special plasma torch (or cutter) with an additional relay and a pair of wires from the torch. The relay in the torch switches when cutting has transferred to the work piece. Plasma cutting systems using this method may begin cutting motion and also activate a height control after detecting that the relay has closed.

Many of these problems were solved by an improved cutting machine disclosed in U.S. Pat. No. 6,218,639, issued 17 Apr. 2001 and incorporated herein by reference. However, some of the problems, such as height control, or control of the cutting torch above the work, can still be a problem in certain applications.

It would be highly advantageous, therefore, to remedy the foregoing and other deficiencies inherent in the prior art.

Accordingly, it is an object the present invention to provide new and improved cutting system controls.

Another object of the present invention is to provide new and improved cutting system controls with an improved height control.

Another object of the present invention is to provide new and improved cutting system controls that operate with virtually any plasma cutter and/or virtually any plasma torch.

Another object of the present invention is to provide new and improved cutting system controls that improve the operation of virtually any plasma cutter.

SUMMARY OF THE INVENTION

Briefly, to achieve the desired objects of the instant invention in accordance with a preferred embodiment thereof, a cutting system utilizing a plasma cutting torch is disclosed. The plasma cutting torch is reciprocally movable relative to a work piece along a Z-axis generally perpendicular to the work piece. The torch is connectable to a power source and provides an arc voltage during cutting, the arc voltage being proportional to a distance between the torch and the work piece. An electrically operable driver is connected to the plasma cutting torch for reciprocally moving the plasma cutting torch along the Z-axis. An electrical height control feedback circuit is connected to the plasma torch and the driver to sense the arc voltage and actuate the driver to move the plasma cutting torch to maintain the arc voltage within a preset limit.

The desired objects of the instant invention are further achieved in accordance with a method of controlling height of a plasma cutting torch relative to a work piece. The method includes a step of providing a plasma cutting torch, a work piece, and an electrically operable driver. The plasma cutting torch is reciprocally movable relative to the work piece along a Z-axis generally perpendicular to the work piece, and the electrically operable driver is connected to the plasma cutting torch for reciprocally moving the plasma cutting torch along the Z-axis. The method also includes a step of connecting the torch to a power source to provide an arc voltage during cutting. The arc voltage is proportional to a distance between the torch and the work piece. Further steps in the method include selecting a height of the plasma cutting torch relative to the work piece, measuring the arc voltage, and activating the driver to move the plasma cutting torch in a direction to maintain the arc voltage so that the actual height is approximately the selected height.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 11 is a pictorial view of a control panel for the plasma controller in accordance with the present invention;

FIGS. 12–16 illustrate several computer screens or settings windows for interfacing with the plasma controller during idle or pause times, and run times.

DETAILED DESCRIPTION OF THE DRAWINGS

Figure 1:
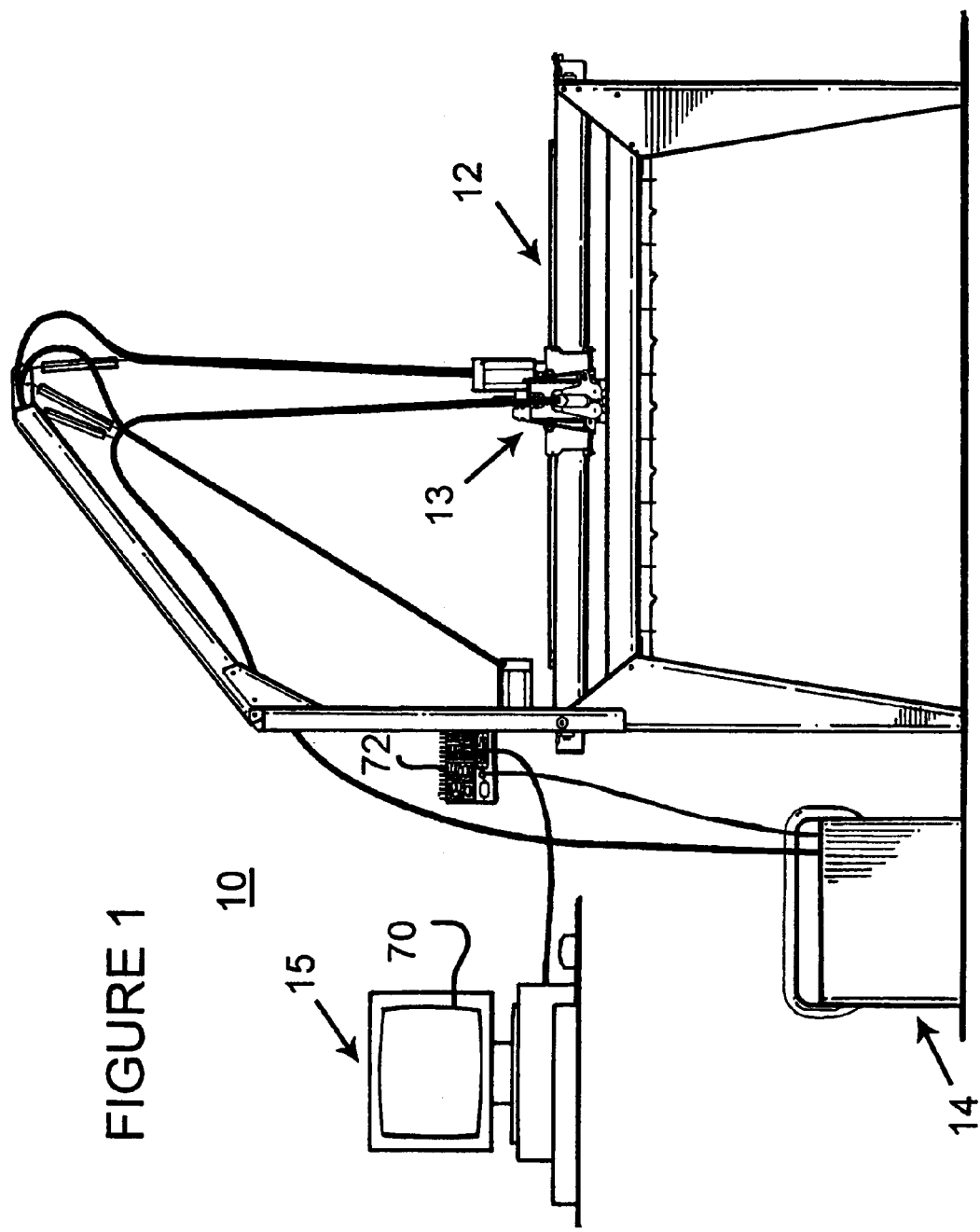
FIG. 1 is a side view of the cutting system according to the present invention.

Turning to the drawings, in which like reference characters indicate corresponding elements throughout the several views, attention is first directed to FIG. 1 which illustrates a cutting system generally designated 10. Cutting system 10 is designed to quickly, easily and economically cut shapes from sheets of rigid materials such as metals. Cutting system 10 includes a platform 12, cutter moving assembly 13, a plasma cutter 14, and a control system 15. While a specific cutting system is disclosed herein for example and to provide support for the description, it will be understood by those skilled in the art that the present novel controls could be incorporated into any of a large variety of cutting systems.

Figure 2:
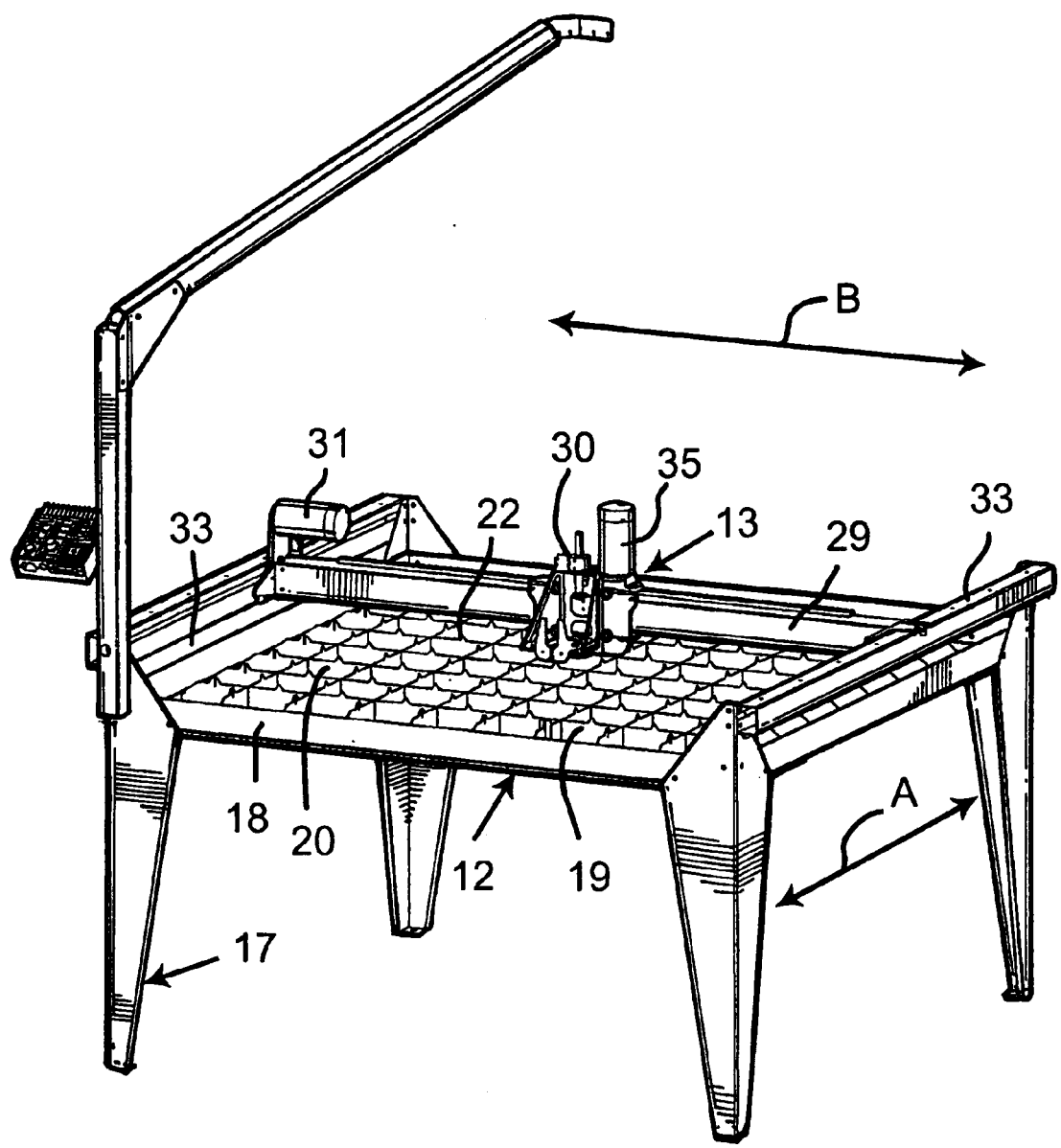
FIG. 2 is a perspective view of the cutting platform of the present invention.

With additional reference to FIG. 2, platform 12 includes a cutting table 17 having a generally horizontal support surface 18. Support surface 18 is preferably composed of a plurality of slats 19 forming a grate 20. Each slat 19 includes a plurality of upwardly directed grate points 22. The plurality of grate points 22 form points upon which a work piece rests. Points 22 reduce the area of contact between support surface 18 and a work piece (not shown) so that cut paths can be formed which will not damage support surface 18.

Still referring to FIG. 2, cutter moving assembly 13 includes a gantry 29, and a carriage 30. Gantry 29 extends between opposing edges of cutting table 17 and is reciprocally moved horizontally over cutting surface 18 by a drive mechanism 31. Drive mechanism 31 drives both ends of gantry 29 through gears at each end driven by a shaft. A pair of tracks 33 is mounted on the opposing edges of cutting table 17, so as to support and guide gantry 29. Gantry 29 is reciprocally movable along a y axis as indicated by double arrow A. Carriage 30 is mounted on gantry 29 for reciprocal movement therealong. Carriage 30 is moved along an x axis by a drive mechanism 35. The x axis is designated by double arrow B, and is substantially perpendicular to the y axis. The cooperation of gantry 29 and carriage 30 allow carriage 30 to be moved to any point on support surface 18 following substantially any path desired. In this manner, substantially any shape can be cut from a work piece.

Figure 3:
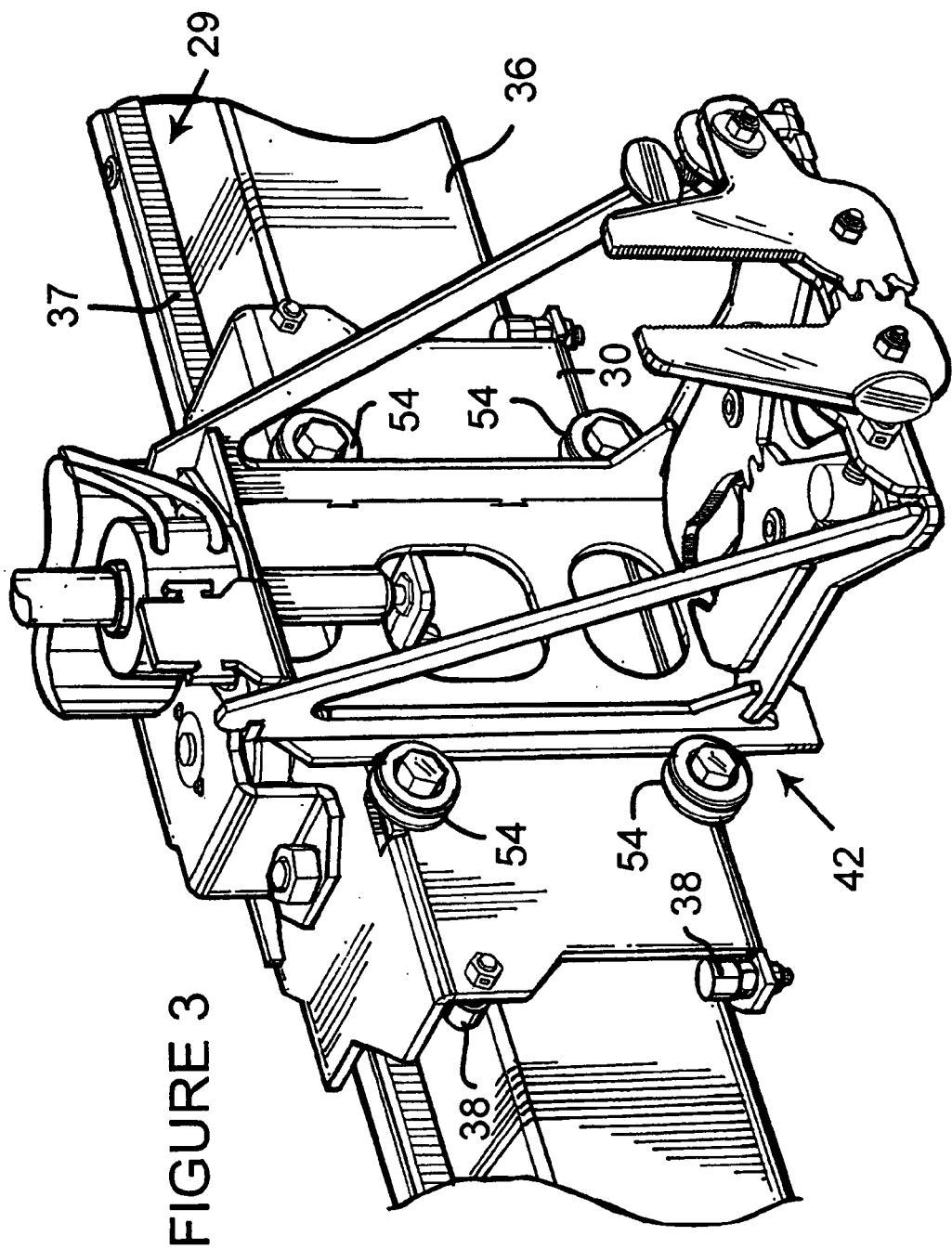
FIG. 3 is an enlarged partial perspective view illustrating the carrier mounted on the gantry of the cutting platform of FIG. 2.
Figure 4:
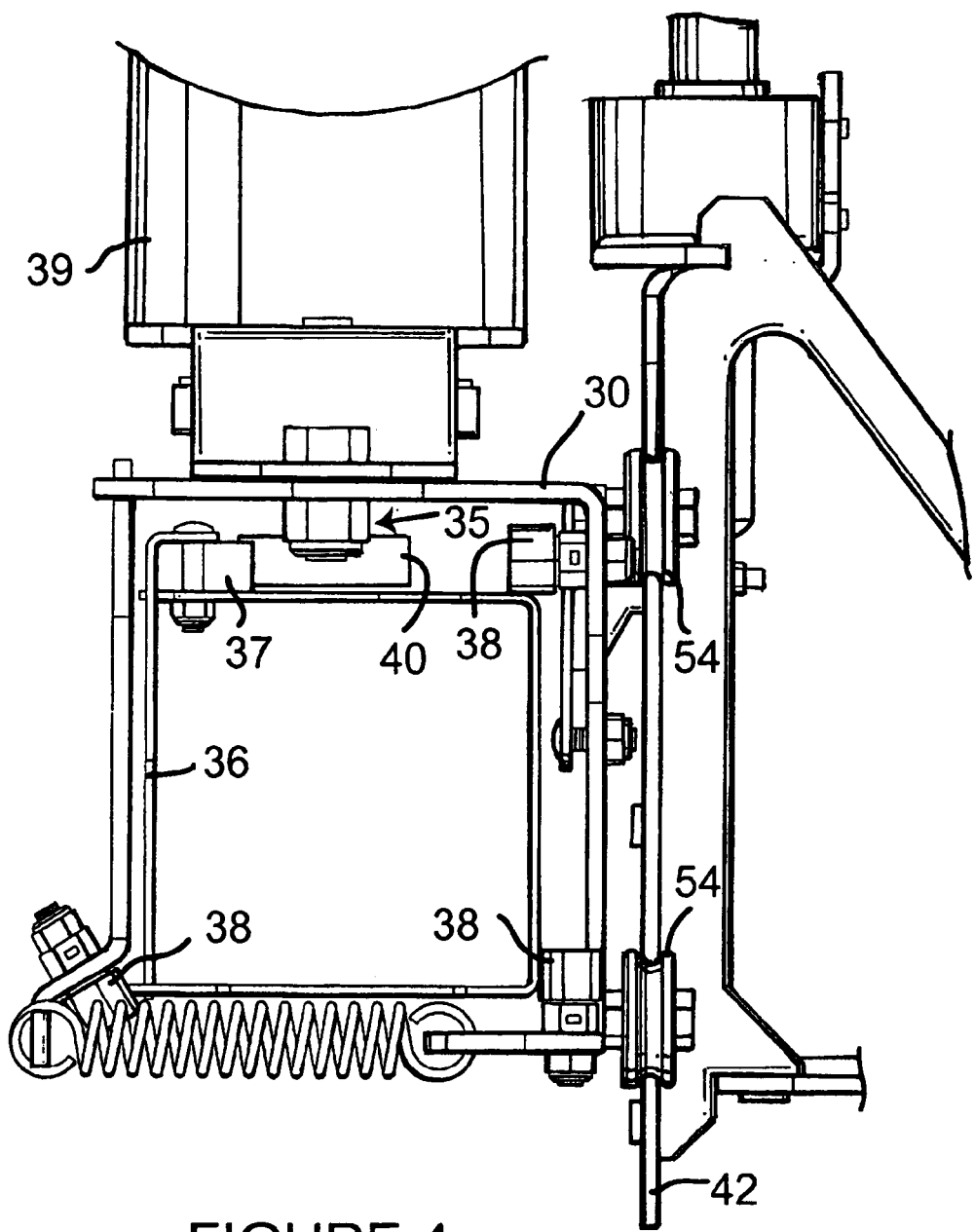
FIG. 4 is a side view of the carrier as it would appear mounted to the gantry.

Turning now to FIGS. 3 and 4, the mounting of carriage 30 on gantry 29 is illustrated. Gantry 29 further includes a two piece tube 36 having a track 37 mounted on the top surface thereof. In the preferred embodiment, tube 36 is formed of two laser cut and bent parts that are welded together, instead of a machined piece of square tubing. Also, gear track 37 is clamped on top of tube 36 to simplify construction and assembly and to improve accuracy. Carriage 30 includes a plurality of rollers 38 configured to engage tube 36 and securely retain carriage 30 thereto. Drive mechanism 35 includes a reversible electric motor 39 carried by carriage 30 which rotates a drive wheel 40. Drive wheel 40 engages track 37 and propels carriage 30 along tube 36. Track 37 and wheel 40 can be, for example, what is conventionally known as a rack and pinion system.

Figure 5:
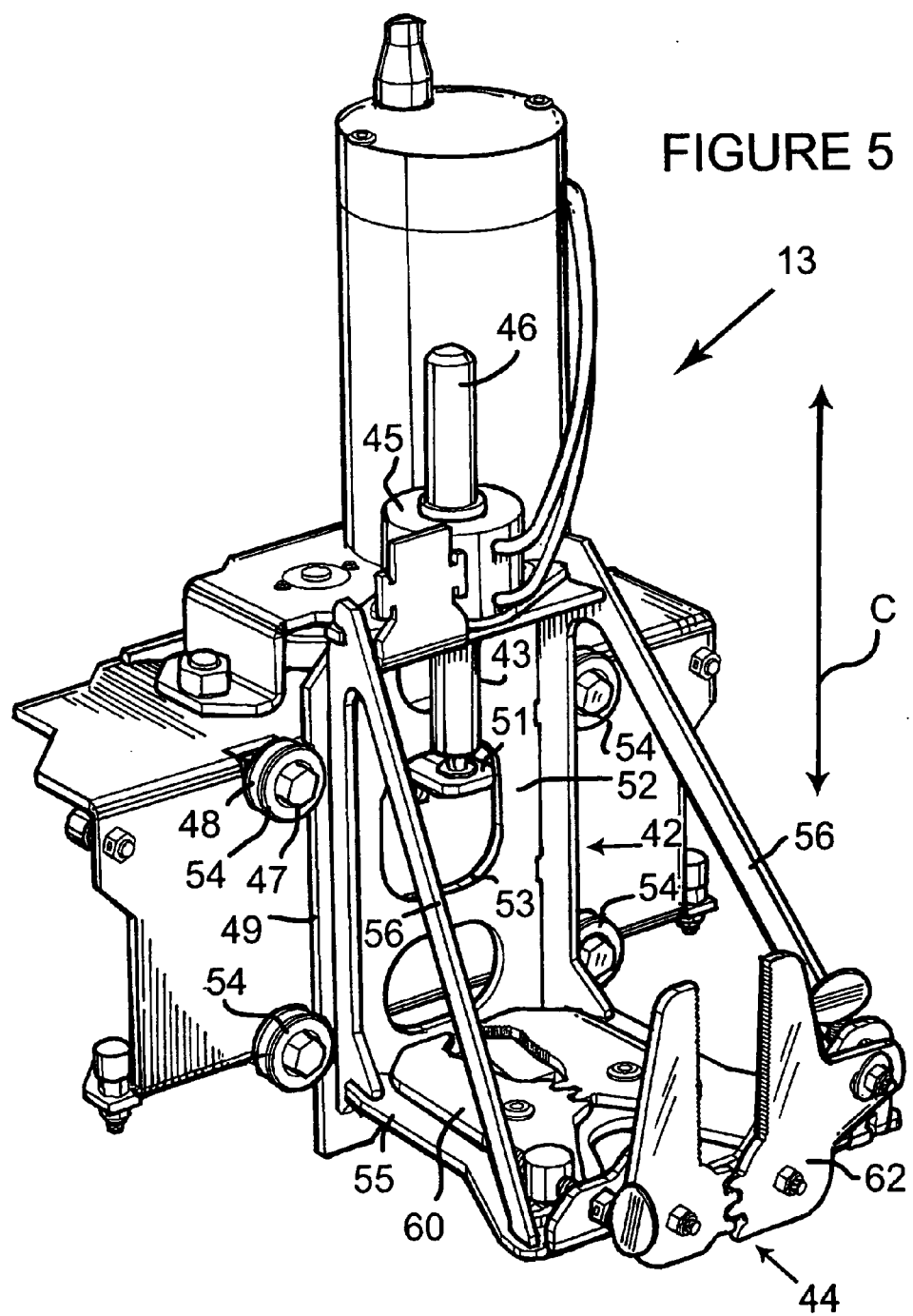
FIG. 5 is a perspective view of the carrier of the cutting platform illustrated in FIGS. 3 and 4.

Referring now to FIG. 5, cutter moving assembly 13 further includes a support 42 carried by carriage 30 and reciprocally movable between a lowered position and a raised position by a drive mechanism 43 along a z axis designated by double arrow C. It should be understood that support 42 can be moved to any position between the raised and lowered positions during operation. Drive mechanism 43 is preferably a nut and screw arrangement allowing for very precise movement. In cutting system 10, a nut/motor 45 (which is a motor and nut arrangement) is fixedly attached to support 42 and a vertical screw 46 is threadedly engaged through nut 45 and fixedly attached to carriage 30 by means of a horizontal anchor 51. Anchor 51 extends through an opening 53 in support 42 and fixedly attaches screw 46 to carriage 30.

Four roller bearing guides 54 are affixed to carriage 30 to provide for easy vertical movements of support 42, relative to carriage 30, and to stabilize support 42. Roller bearing guides 54 include bearing rollers, rather than frictional sliding guides, to improve vertical movement and reduce friction and wear. Also, each roller bearing guide 54 includes a "wheel" 47 with a circumferential groove 48 in the periphery designed to engage the inner and outer corners of a vertical edge 49 of a plate 52 so as to leave an opening between the edge 49 and the bottom of groove 48. This unique design allows metal dust to fall through the opening between wheels 47 of roller bearing guides 54 and opposed edges 49 of plate 52, rather than jamming it up like conventional rollers typically do. Further, roller bearing guides 54 reduce the amount of side-to-side movement previously required by frictional guides and, therefore, greatly improve total accuracy during cutting with the Z-axis in use.

Figure 6:
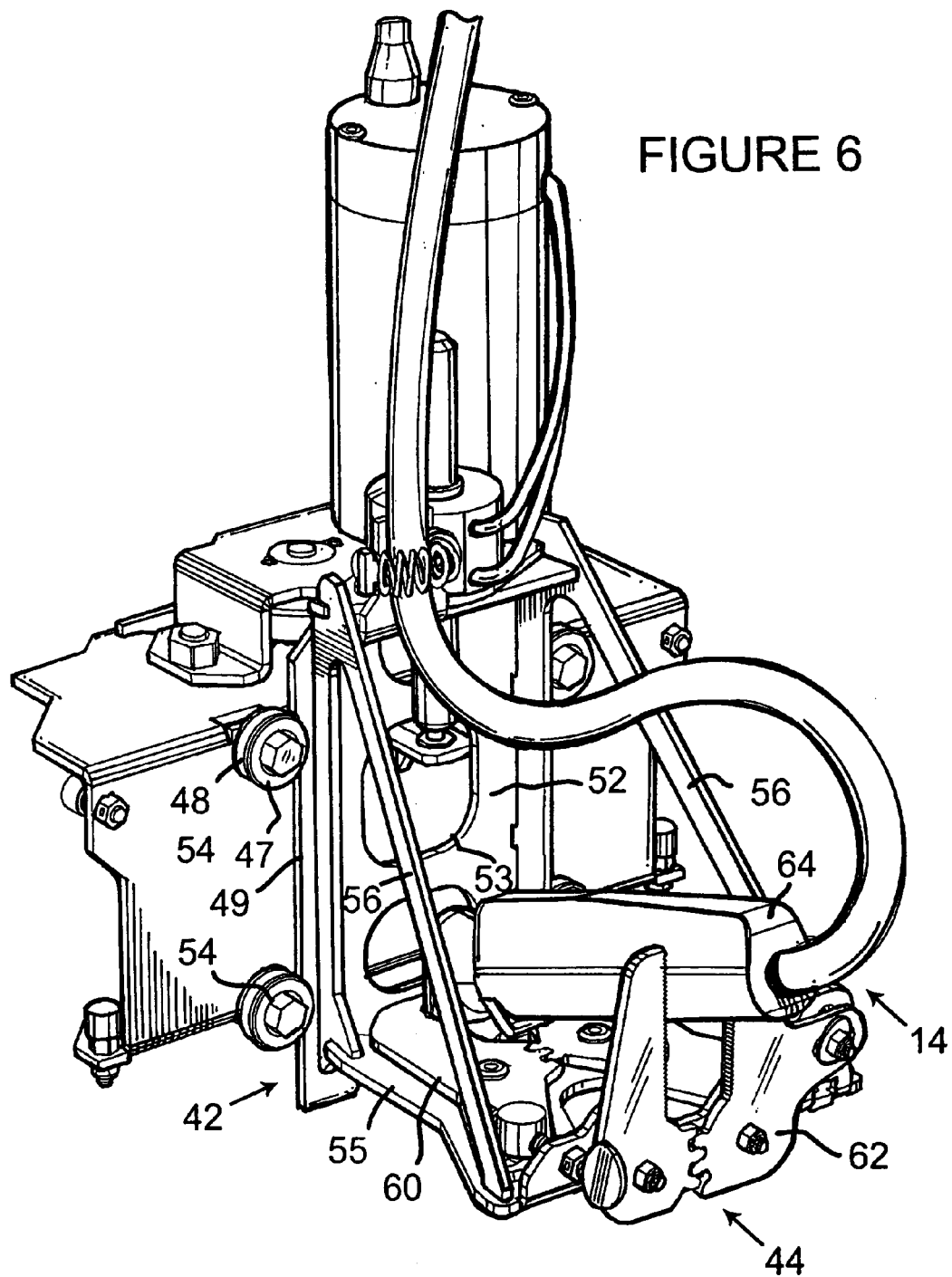
FIG. 6 is a perspective view of the carrier of FIG. 5 carrying a hand held plasma torch.

Referring to FIGS. 5 and 6, support 42 includes upright portion (plate) 52 and a horizontal portion 55 extending from a lower edge of portion 52. A pair of angled struts or braces 56 is attached between upright portion 52 and the distal end of horizontal portion 55 to provide additional support to horizontal portion 55. A cutting torch holder 44 is coupled to support 42 and movable along the Z-axis (with support 42) by rotation of nut/motor 45. In cutting system 10, holder 44 is mounted above a cutout portion in horizontal portion 55 of support 42 and is joined to horizontal portion 55 of support 42 at a distal edge. Cutting torch holder 44 includes a substantially horizontal gripping member 60 and an upright gripping member 62 for gripping a plasma torch of plasma cutter 14. In cutting system 10, plasma cutter 14 includes a handheld plasma torch 64 and main cord. A nozzle 65 (not visible in FIG. 6) of torch 64 is positioned to be substantially perpendicular to horizontal portion 55 of holder 44 and to extend through the cutout portion in horizontal portion 55. The improved support 42 for torch holder 44 holds the torch more rigidly for more accuracy, and provides an easy-to-make laser cut design.

Referring back to FIG. 1, control system 15 includes a main computer 70 containing software for importation, alteration or creation of a design using a CAD program. The design or shape is made up of a plurality of vectors which computer 70 translates into a set of digital coordinates and movement directions. These directions are output to a controller or control box 72 which converts them into driver impulses for controlling the drive mechanisms of cutter moving assembly 13. The computer directly controls the operation of the plasma cutter. A user simply creates, imports or changes a design and directs the computer to begin cutting. In operation, computer 70 includes a program, such as a CAD program that translates a plurality of vectors defining a work to be cut into movement commands. Drivers in control box 72 are coupled to computer 70 to receive the movement commands and control gantry movement and carriage movement. Computer can further include a program for importing, altering, and/or creating designs having a plurality of vectors. Gantry movement and carriage movement is achieved by electric motors 31 and 39 mechanically coupled to the gantry and carriage and electrically coupled to the drivers.

Figure 7:
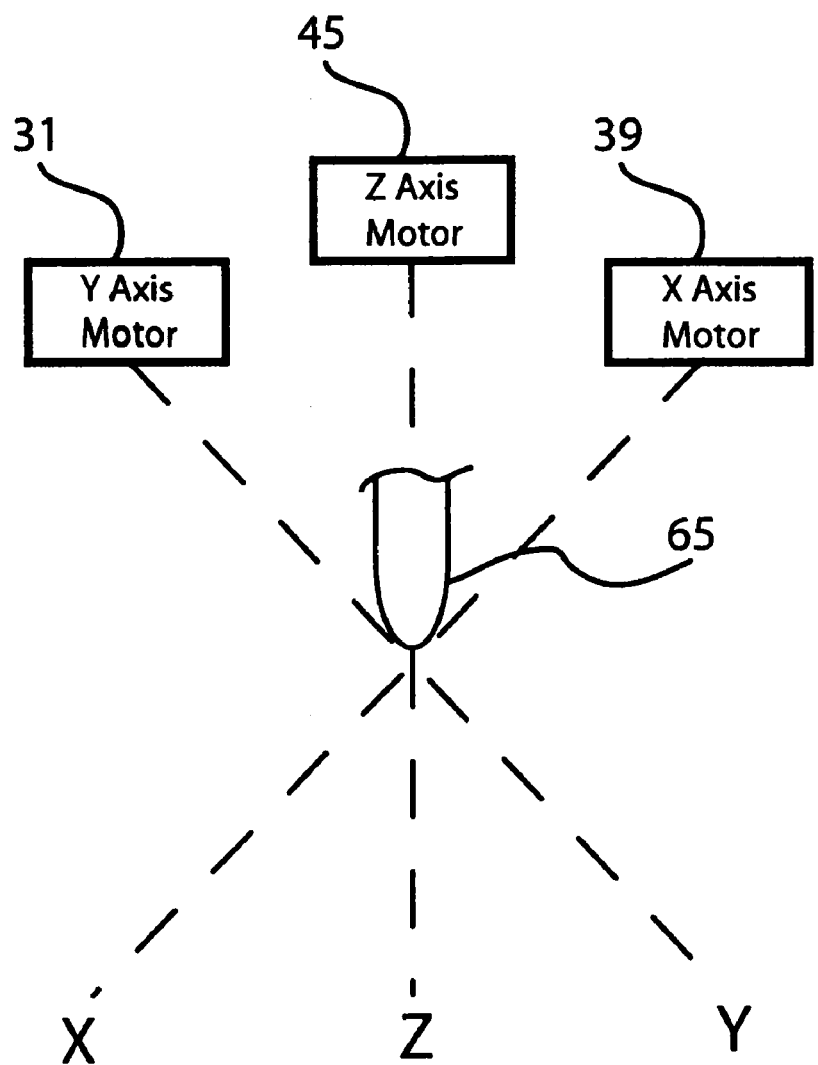
FIG. 7 is a semi-graphical representation of plasma cutter tip movement in response to motor activation.

Basically, the concept defined above by the specific apparatus described is the movement of a plasma torch in the X, Y, and Z directions to provide desired cutting. As illustrated in FIG. 7 the X, Y, and Z axes are mutually perpendicular or orthogonal so that, as is understood by those skilled in the art virtually any cuts can be performed. Again it must be stated that virtually any plasma cutter and controller can be used in the present invention, as long as the drivers, such as motors or the like, are controllable in speed and direction as described below. Motors 31, 39, and 45 are illustrated for convenience of understanding but any reciprocal driving device can be utilized.

Figure 8:
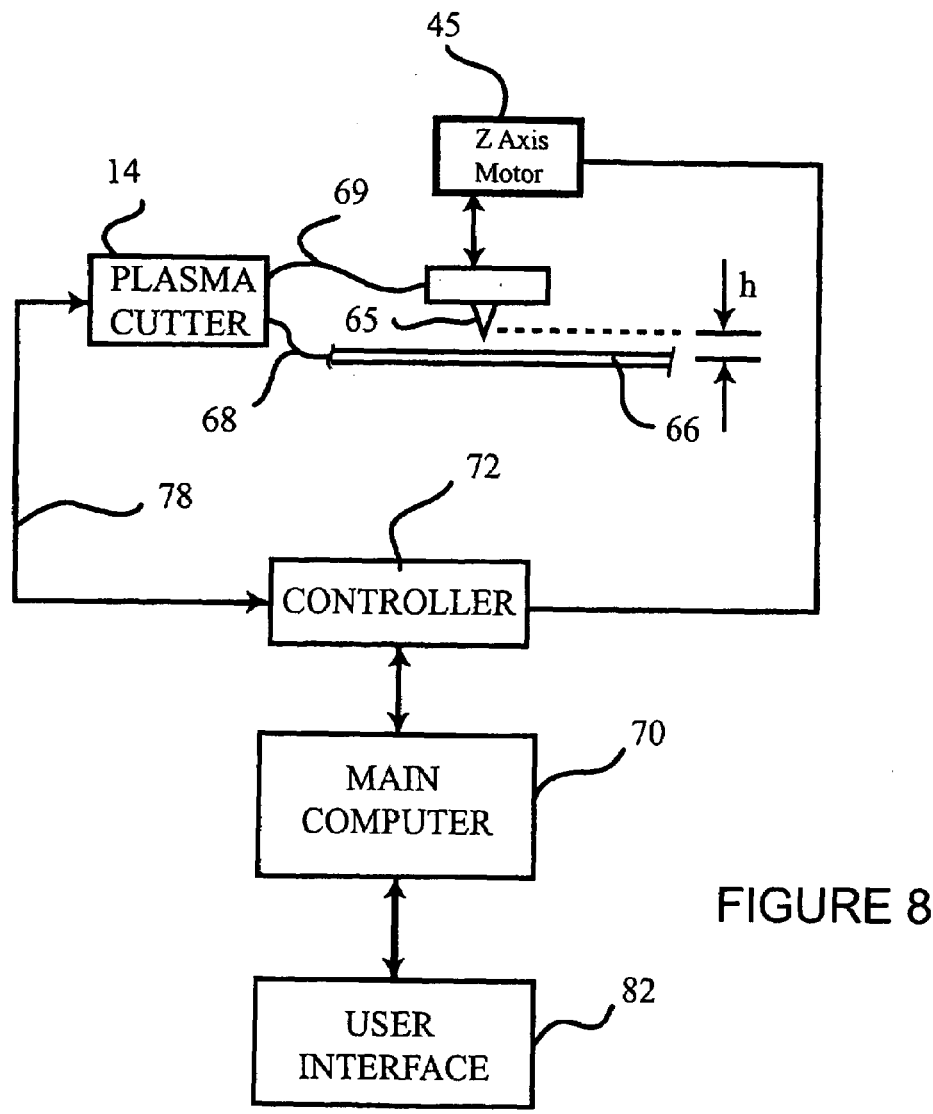
FIG. 8 is a simplified block diagram of a plasma cutter with a control system in accordance with the present invention.

Turning to FIG. 8, a work piece 66 is correctly positioned and held on a support surface (e.g. support surface 18) and a work piece wire 68 is connected to it. An electrode or nozzle 65 of a plasma torch (e.g. handheld plasma torch 64) is positioned over work piece 66 and includes an electrode wire 69. An arc voltage is defined as the voltage between electrode wire 69 and work piece wire 68. The arc voltage directly powers the plasma arc in the cutting process. Normally, when the plasma torch is cutting a piece of metal, the level or amplitude of the arc voltage can be used to deduce how far nozzle 65 is away from the surface of work piece 66, designated h in FIG. 8. That is, the higher the arc voltage the farther away (the greater the separation h) nozzle 65 is from work piece 66.

In early attempts to control the height h using the arc voltage, a tolerance for h was set and whenever the arc voltage got out of tolerance Z-axis motor 45 was activated at a user-adjustable climb or dive. However, when speeds of any significance were used in conjunction with a reasonably tight tolerance, the machine oscillated badly. Careful study determined that the oscillations were a result of a delayed response between the Z-axis motor movements and the resulting change in arc voltage that was measured at the controller. As a result of the study it was found that the Z-axis motor had already moved the nozzle past the point where it needed to move to by the time the controller measured an arc voltage that is correct, so the Z-axis motor had to keep reversing direction, resulting in the oscillations. The cutting system controls described below solve this problem.

Figure 9:
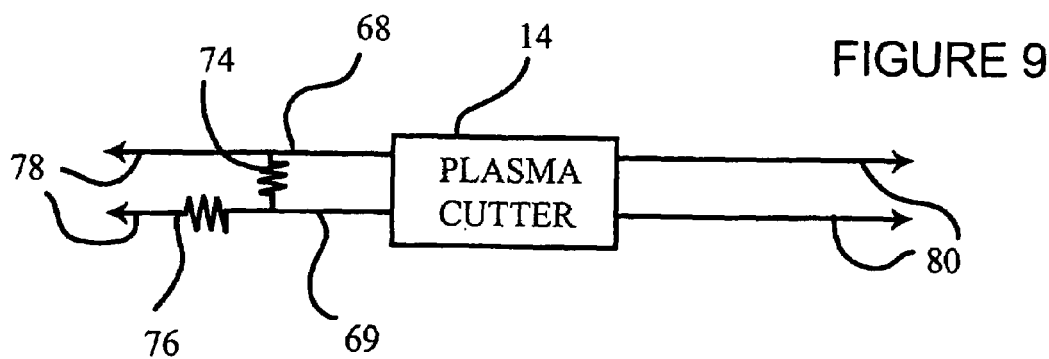
FIG. 9 is a simplified schematic diagram of a wiring harness interfacing between a plasma cutter and the plasma controller.

As illustrated in FIG. 8, work piece wire 68 and electrode wire 69 connect the plasma arc voltage within plasma cutter 14 for sensing the amplitude of the plasma arc. Referring additionally to FIG. 9, a wiring harness interfacing between plasma cutter 14 and a plasma controller 72 is illustrated. The wiring harness electrically connects directly to the work piece and indirectly to electrode wire 69 (although the same wire designations are used for better understanding). Voltage divider resistors 74 and 76 are used to reduce the arc voltage to a safe level (about 10 volts maximum in this embodiment) to help prevent serious electrical shocks. Resistor 74 is connected between leads 68 and 69 and resistor 76 is connected in series by leads 78 to controller 72. In this preferred embodiment resistor 74 is approximately 33k Ohms and resistor 76 is approximately 680k Ohms to provide the desired step down in voltage. Resistors 74 and 76 also add impedance to the arc voltage signal, which reduces noise that would otherwise be transferred into controller 72 and potentially disrupt other electronic functions. The interface wiring harness also includes trigger wires 80 for turning the cutting arc on and off.

Referring again to FIG. 8, the main computer 70 is connected to controller 72 for controlling the X, Y, and Z motors or drivers to change positions of arc nozzle 65 in accordance with a desired cut. Controller 72 includes a microprocessor that is programmed to compute the arc voltage as will be explained in more detail presently. A user interface 82 is coupled to main computer 70 and provides any additional inputs or information required.

Figure 10:
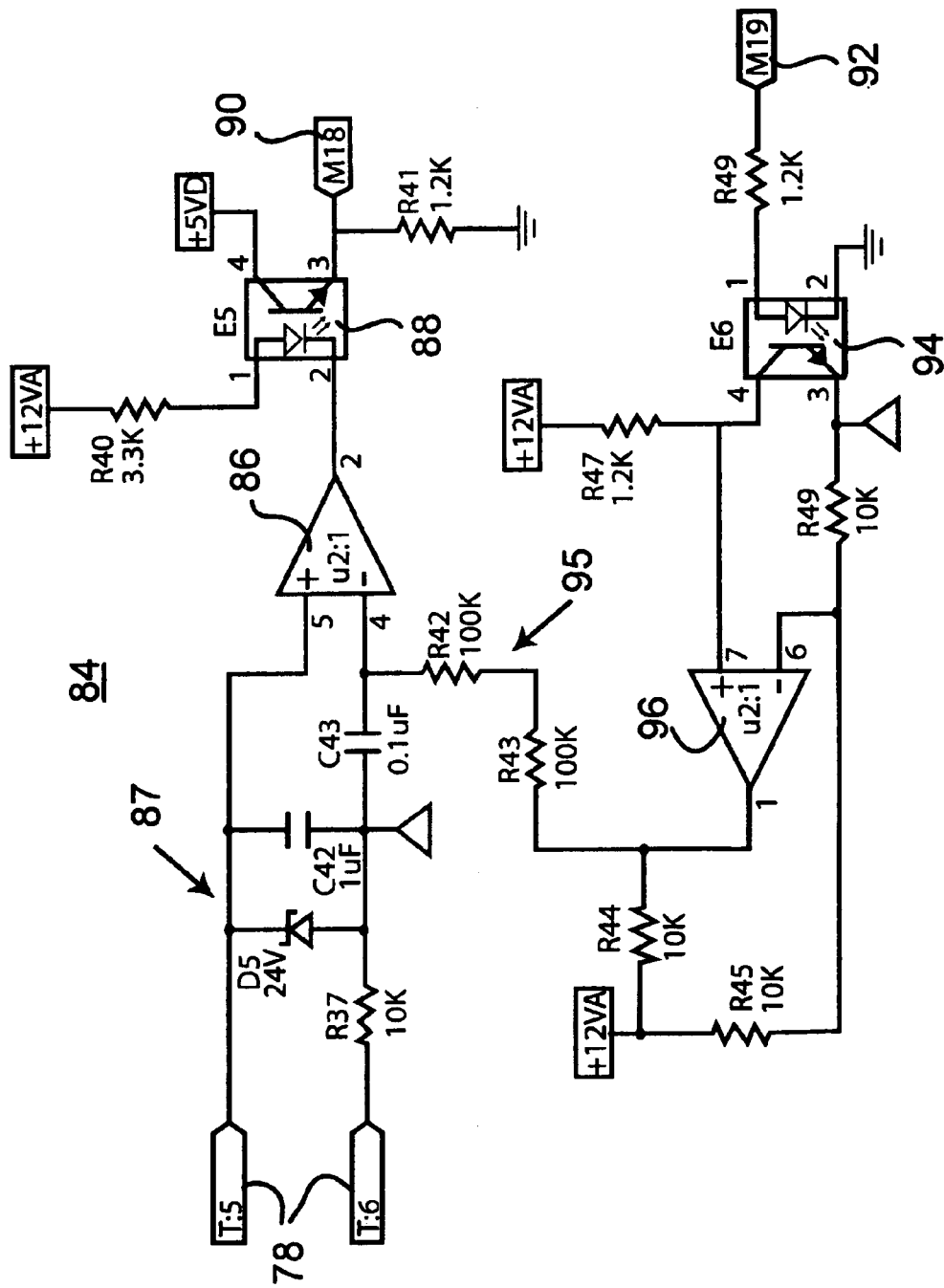
FIG. 10 is a schematic diagram of a sensor circuit in the plasma controller for reading the arc voltage of a plasma cutter.

Turning now to FIG. 10, a schematic representation of an arc voltage sensor 84 included in controller 72 is illustrated. Leads 78, connected to sensor 84 from the interface wiring harness of FIG. 9, are connected through an RC filtering circuit 87, including a series resistor (R37), a parallel Zenner diode (D5) or transient voltage suppressor, and a parallel capacitor (C42), to an input of a comparator 86. The output of comparator 86 is coupled through an optical isolator 88 (LED and light sensing transistor) to an output terminal 90, which is connected to the microprocessor in controller 72.

An input signal at input terminal 92, from the microprocessor in controller 72, is coupled through an optical isolator 94 to a circuit, including a second comparator 96, that "cleans up" the signal (to reverse some of the degradation caused by optical isolator 94). The output signal from comparator 96 is coupled through an RC filtering circuit 95 (including resistors R43 and R42 and capacitor C43) to a second input of comparator 86. Also, the components provide a simple analog-to-digital conversion.

The microprocessor in controller 72, at a constant frequency of about 12 kHz in this specific embodiment, continually switches input terminal 92 to the same state as output terminal 90. This produces a voltage in RC filtering circuit 95 that closely matches the reduced, filtered arc voltage that is carried in RC filtering circuit 87. Based on the amount of time input terminal 92 (i.e. the input polarity) is switched high versus low and the known RC characteristics, the microprocessor closely approximates the voltage in RC filtering circuit 95 mathematically. The actual mathematics for this is (computed to 16 bits at 12,000 times a second)

new reading=signal(1 or 0)*256+previous reading*255/256

It should be understood that the measuring circuitry, analog-to-digital conversion, and method described are preferred for their simplicity but other circuitry and methods may be utilized in some applications. Also, the circuitry of arc voltage sensor 84 is optically isolated from the controller circuitry, which allows the arc voltage to float and vary from the voltage of the rest of the circuit, preventing damage to other circuits and severe interference that could otherwise happen.

The measured arc voltage is used by the microprocessor in controller 72, according to the commands sent by main computer 70 (explained in more detail below) to control the height h of nozzle 65. In this preferred embodiment, for example, the measured arc voltage is converted to inches and compared to desired or selected settings introduced into the apparatus by an operator (described in more detail below). It will, however, be understood that a variety of different methods might be devised for using the arc voltage to determine the actual height h of nozzle 65 above work piece 66 and driving Z-axis motor 45 to move h toward the desired or selected setting. Also, whether the height is maintained within a prescribed limit or the arc voltage is maintained within prescribed limits are mutually inclusive, since the arc voltage is proportional to the height. Thus, it should be understood that all of these various methods and apparatus are intended to be encompassed by the statement "an electrical height control feedback circuit connected to the plasma torch and the driver to sense the arc voltage and actuate the driver to move the plasma cutting torch to maintain the arc voltage within a preset limit."

Figures 11, 13:
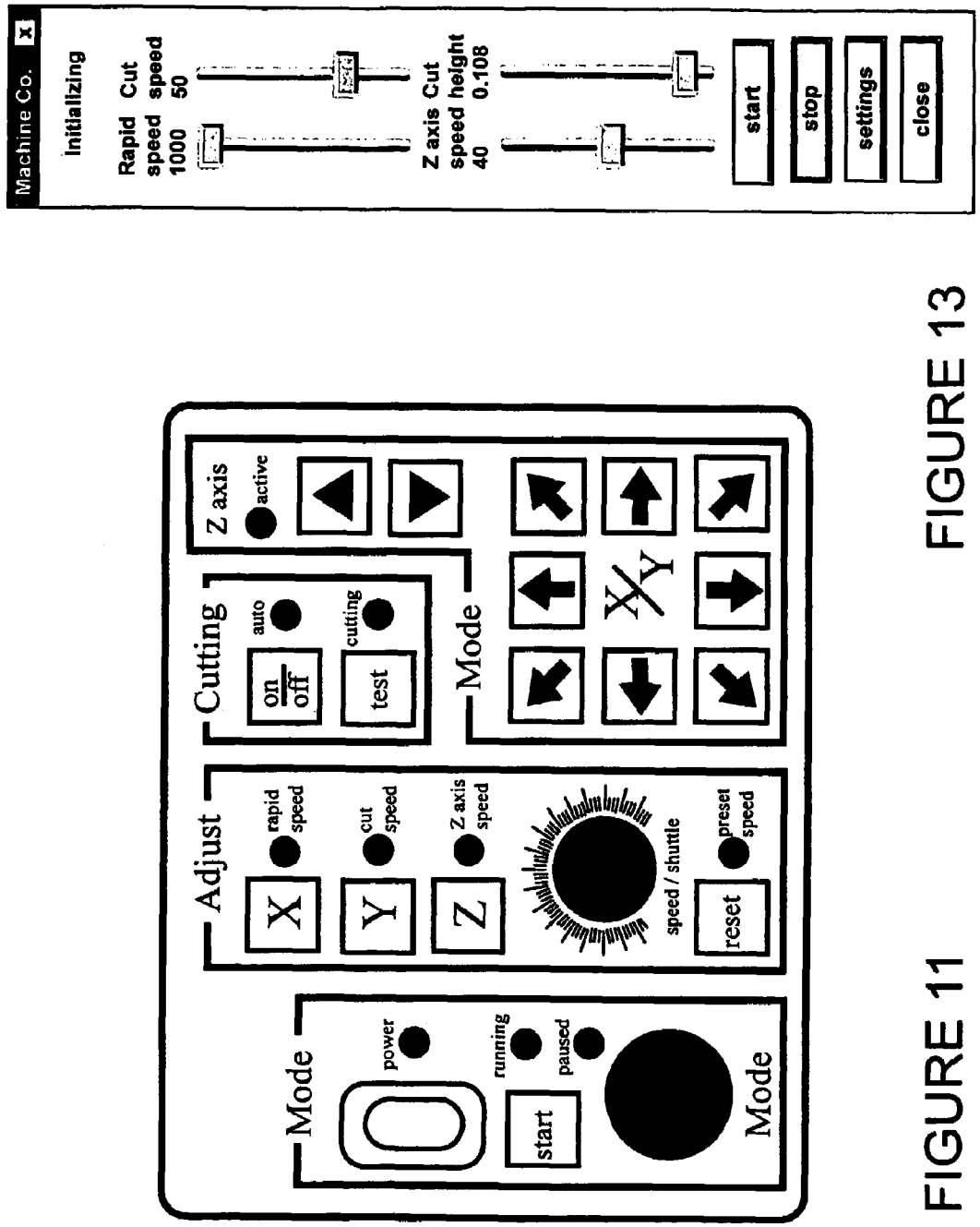

Referring to FIGS. 11–16, several different interfaces are illustrated for affecting the height control of nozzle 65. FIG. 11 illustrates a control panel for the cutting system, which may be carried by controller 72 or user interface 82 (see FIG. 8) for example. As can be seen from FIG. 11, the control panel includes several controls that are self-explanatory, including various speed control adjustments. The control panel also includes up and down buttons for the Z-axis, which simply raise and lower nozzle 65 when the machine is not cutting or raise and lower nozzle 65 when the machine is cutting and the arc voltage feedback height control is turned off (so the height is controlled manually). Additionally, if the machine is cutting with the auto height control the buttons for the z-axis raise and lower nozzle 65 indirectly, by changing the "cutting height" settings. Also included are eight directional jog buttons that directly jog the machine in any of eight different directions simply by pressing the correct arrow and jog speed can be changed on the fly by turning the speed dial.

FIGS. 12, 14, 15, and 16 illustrate a computer screen and settings windows that are primarily used for interfacing with the plasma controller during idle or pause times. When the machine is idle or paused, the user can open the settings window, which has many additional settings for the height control. Using the settings window, the user can turn on or off the machine's ability to automatically raise and lower nozzle 65 between cuts (to help the machine clear obstacles). The user can adjust the speed of the torch movements. Also, the user can command nozzle 65 to stall on the material to sense the height when it prepares to pierce a cut. At this point, using the settings window, the user can adjust any of the height settings. Six settings on the right of the settings window apply just to the arc voltage feedback part of the height control. These six settings include (in vertical sequence): cutting height; height tolerance; maximum climb; maximum dive; climb zone; and dive zone. For convenience, the settings are in inches or inches/minute so that conversions back and forth to the arc voltage are not required. In the present cutting system the scaling conversions are provided automatically by the software.

Referring to FIG. 13, several slider bar controls are illustrated in another computer settings window that can be called up by the user. This window includes four slider bars including: a rapid speed control; a cut speed control; a Z-axis speed control; and a cutting height control. The cutting height of nozzle 65 can be adjusted during operation using the control panel buttons or the sliders of the settings window.

Referring additionally to FIG. 14, five settings for controlling Z-axis movement are provided and illustrated for controlling how precisely the cutting height is maintained. While the "response time" of the Z-axis adjustment is not adjustable, the rates of speed increase, the maximum speeds, and the tolerance (or response zone) are all adjustable.

Figure 17:
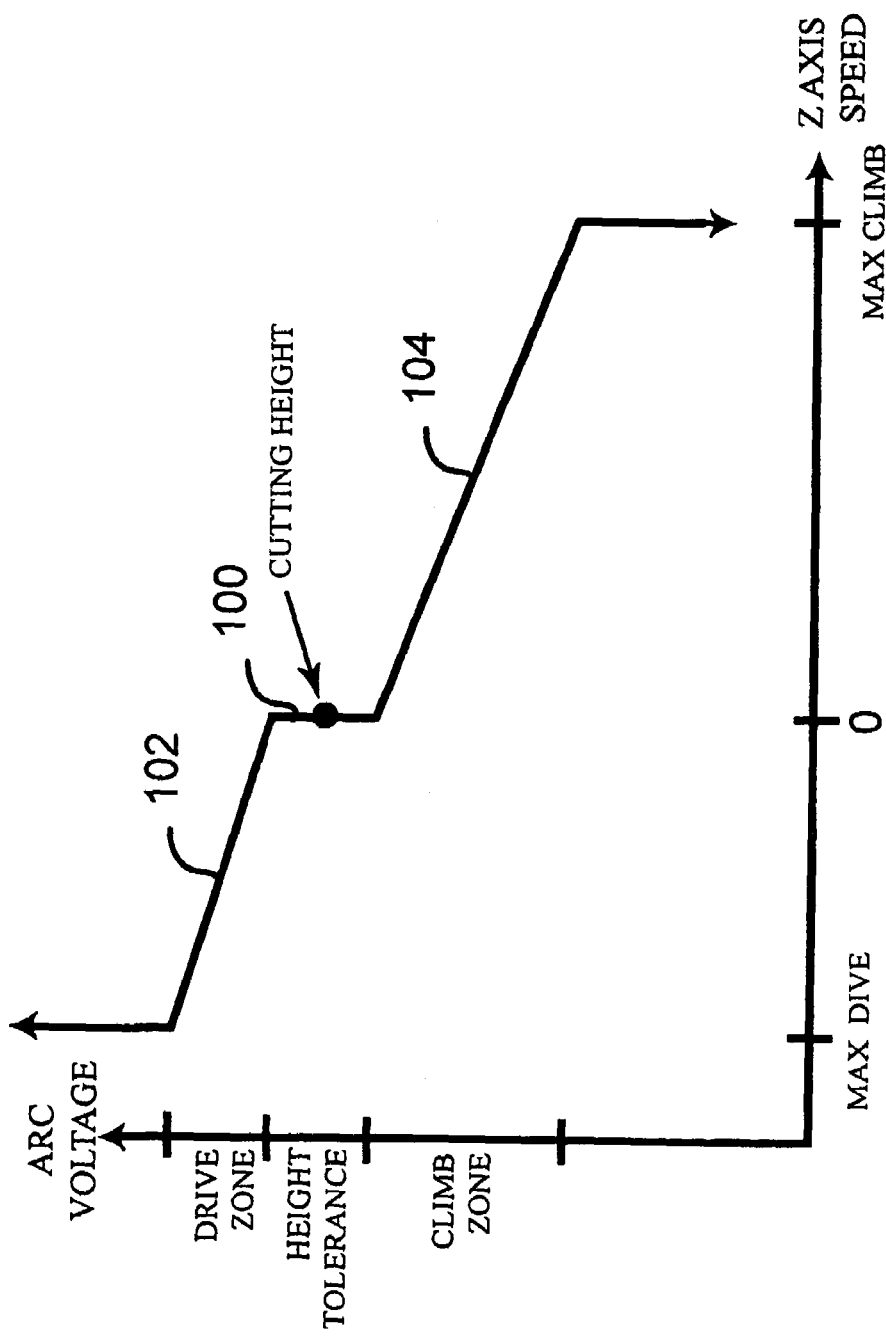
FIG. 17 is a graphical representation of user settings versus plasma torch tip or nozzle movement in the Z-axis.

When the digital height control is in operation during cutting, the arc voltage is used in the feedback loop described above to control the height of nozzle 65 through Z-axis motor 45. The arc voltage is proportional to the height of the torch. Referring now to FIG. 17, user settings versus plasma cutter tip movement in the Z-axis is graphically represented. Basically, when the arc voltage increases, Z-axis motor 45 moves nozzle 65 down and when the arc voltage decreases, Z-axis motor 45 moves nozzle 65 up. The rates of movement, the rates of speed increase, the maximum speeds, and the tolerance are all adjustable.

As illustrated by the straight vertical line 100 in the center of the graph, Z-axis motor 45 does not move when the measured height h of nozzle 65 is near (within the preset tolerance) the selected cutting height. Another way to look at this is that first, upper and lower arc voltages are determined from the height and tolerance settings (cutting height and height tolerance are two of the settings in the settings window of FIG. 12) and scaling parameters. When the actual arc voltage measures between the thresholds, Z-axis motor 45 does not move. Here it can be noted that if the tolerance is set to zero, Z-axis motor 45 will constantly move back and forth trying to duplicate the height setting exactly. If the tolerance is set to a more practical setting, e.g. 0.030", nozzle 65 will be allowed to get off in its height by as much as 0.015" in either direction before any corrective action is taken by Z-axis motor 45.

Also, as can be seen by ramped lines 102 and 104 in the graph of FIG. 17, Z-axis motor 45 doesn't normally respond at full speed when the arc voltage drifts just outside of the allowable range (line 100). Instead, the speed is ramped up in proportion to the deviation until maximum dive or climb speeds are reached. Each of the ramps, individually, is an adjustment provided in four of the settings in the settings window of FIG. 12 (i.e. maximum climb, maximum dive, climb zone, and dive zone). This is important in providing a high-speed response in height adjustment without producing oscillations. Only if the operator sets the ramp zones to zero will Z-axis motor respond at full speed as soon as the arc voltage goes beyond tolerance. The maximum climb/dive speeds and the climb/dive zones control the rate of response of Z-axis motor 45 and the maximum speed it will be allowed to go. These controls allow the user to tune the cutting system for really fast responses without creating an oscillation condition. It also allows the user to customize their setup. For example, if the user is having trouble with nozzle 65 diving down into the material, they can set the dive response much slower than the climb response.

Also, the software determines multiplication rates for the lowering and raising actions, based on the dive/climb zones 102 and 104 and the maximum settings (bottom four settings illustrated in FIG. 12). These multiplication rates are used by controller 72 to determine the Z-axis speed based on how far the arc voltage reading is above or below the thresholds (tolerances). The actual equation, in this embodiment, is:

$$Z\text{-axis speed} = [\text{upper/lower threshold} - \text{arc voltage measurement}] * \text{multiplication rate}$$

Hence, the farther the reading is outside of the threshold, the faster Z-axis motor 45 is commanded to move. The speed is limited to the speeds in the settings, however. Once the above equation produces a higher speed than the user has asked for in max (set into the system) the speed simply becomes max. Note that since the multiplication rates are determined from the zone settings, the speed limit kicks in at the point where the arc voltage reading gets outside of the threshold by the corresponding zone distance.

In a specific example of the above described settings, nozzle 65 can get as low as 0.094" or as high as 0.122" without Z-axis motor 45 moving at all. Z-axis motor will not move up at full speed unless the nozzle height gets below 0.036". Z-axis motor 45 will not move down at full speed unless nozzle 65 gets above 0.199". The speed of Z-axis motor 45 is variable within the zones, according to how far the nozzle height is outside of the threshold. It should be noted that these numbers reflect the specific values shown in FIG. 12.

Main computer 70 and user interface 82 can provide a reading of the arc voltage in a diagnostic window so testing and troubleshooting can be performed easily. Also, an arc voltage calibration window (see FIG. 15) can be called up by the user to supply certain settings for the arc voltage to computer 70 and/or controller 72. By using these settings the minimum and maximum measured arc voltage settings can be introduced into the system. Controller 72, using the minimum and maximum settings, can then determine whether or not the plasma torch (nozzle 65) is cutting, by comparing the measured voltage to the minimum and/or maximum settings. The height of nozzle 65 (in inches) can be derived from the arc voltage measurements during cutting. To convert from one to the other, the operator multiplies and offsets the number (according to the standard algebraic equation: $Y = mX + b$. The actual conversion equations are:

$$(V) = [\text{torch height} + \text{shift setting}] * \text{scale setting where } V \text{ is the Reduced arc voltage}$$

$$\text{torch height} = V/\text{scale setting} - \text{shift setting where all of the settings are in inches or } v/\text{inch}.$$

The user can adjust the scale and shift settings in the software (using the computer windows provided) to tune the system to his particular plasma torch or plasma cutter configuration. The scale doesn't typically need to be adjusted for different plasma torches but the shift setting does. A zero button is provided as one way to calibrate the shift setting. Also, it should be noted that the min cutting signal and the max cutting signal are adjustable, using the computer window of FIG. 15. These signals are used by the microprocessor in controller 72 to determine from the measured arc voltage whether or not the plasma torch is actually cutting (i.e. if the measured arc voltage is between the two settings, the torch is determined to be cutting).

The present cutting system also includes an adjustable time delay that applies, in this preferred embodiment, after the cutting signal (arc voltage and/or start of cutting, described above) has been measured. A time delay computer window (illustrated in FIG. 16) can be called up by the operator and several time delay settings introduced into the computer. In many applications a time delay may be useful because, for example, different materials take different amounts of time to pierce, so the operator usually wants to wait until the pierce is done and not just start moving at the start of cutting.

The logic in the present cutting system stops the cutting motion if the feedback signal is lost, for any reason including extreme electromagnetic interference (EMI), and provides the user with an error message. The software logic associated with controller 72 and user interface 82 also, temporarily, turns off the height control loop when nozzle 65 is moving over an area known to already be cut, or when nozzle 65 slows down for corners or holes. At the end of each cut, the height is automatically re-zeroed, based on the height control settings (window of FIG. 12). The system operator can pause the system during cutting, to change any of the settings for the height control, then they can resume cutting (for example, if something needs adjustment). Also, the height itself can be adjusted during cutting without pausing, as discussed above. This helps the torch pierce at the correct height on the next cut, even though the material may warp up or down. The well known stalling method is another way to accomplish this feature and settings for this method are supplied in the window illustrated in FIG. 14.

With all plasma cutting systems (e.g. plasma cutters), there is a need to synchronize the start of the cutting motion to the start of cutting at the torch, since there may be unpredictable delays in how long the torch takes to fire. Because of the unique arc voltage measuring circuitry and controls, the present cutting system or machine is able to sense when the plasma torch starts cutting and then move along the prescribed path. This feature in the present cutting system improves consumable life and reduces operator intervention. Also, in the present cutting system a single torch interface cable (see FIG. 9) plugs into the controller and controls the plasma cutter at the main power supply. To use the plasma torch for other cutting applications, the interface harness is simply unplugged from the controller. Thus, because of the standardized wiring, any plasma cutter and/or plasma torch can be used in the present system.

It will be understood by those skilled in the art that terms such as "height" and "above" the work piece are relative terms used to indicate relative positions and are not intended to limit the disclosure to any specific embodiment or position in space. For example, the term "height" is simply meant to designate a distance between the nozzle of a torch and the work piece.

Thus, a new and improved cutting system has been disclosed. The new and improved cutting system uses feedback from the arc voltage to control the height of the nozzle or torch above the work piece. Thus, no cutting or movement is initiated until the torch is operating and all of the advantages of height control are realized. Also, response times and tolerances are completely adjustable so that the height is controlled rapidly and efficiently. Further, the new and improved cutting system is simple to use and relatively inexpensive to manufacture.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A cutting system comprising:
   a plasma cutting torch reciprocally movable relative to a work piece along a Z-axis generally perpendicular to the work piece, the torch being connectable to a power source and providing an arc voltage during cutting, the arc voltage being proportional to a distance between the torch and the work piece;
   an X-axis reciprocal driver and a Y-axis reciprocal driver for moving the torch horizontally along any prescribed path on the work piece;
   an electrically operable Z-axis reciprocal driver connected to the plasma cutting torch for reciprocally moving the plasma cutting torch along the Z-axis;
   a controller including a microprocessor coupling the controller to the X-axis reciprocal driver, the Y-axis reciprocal driver, and the Z-axis reciprocal driver, the controller having individually adjustable settings including a climb zone setting, a dive zone setting, and a selected rate setting, Z-axis driver speed is increased at the selected rate in the selected climb zone and the selected dive zone, and the controller further includes a maximum climb rate setting greater than the selected rate setting and a maximum dive rate setting greater than the selected rate setting for controlling the Z-axis driver speed outside the climb zone and dive zone, respectively, to tune the cutting system for a fast response without creating an oscillation condition; and
   an electrical height control feedback circuit connected to the plasma torch and the driver to sense the arc voltage and actuate the driver to move the plasma cutting torch to maintain the arc voltage within a preset limit, the feedback circuit is further connected to the controller for actuating the driver at a rate in accordance with tuning of the cutting system.

2. A cutting system as claimed in claim 1 wherein the electrical feedback circuit includes an analog-to-digital converter for converting the sensed arc voltage to a digital signal.

3. A cutting system as claimed in claim 1 including electrical controls associated with the electrical feedback circuit for setting a tolerance of the sensed arc voltage within which the driver does not move the plasma cutting torch.

4. A cutting system as claimed in claim 3 wherein the any of the individually adjustable settings of the controller are adjustable during cutting.

5. A cutting system as claimed in claim 1 wherein the climb zone setting and the dive zone setting along the Z-axis are separately adjustable.

6. A cutting system as claimed in claim 1 including optical isolators electrically separating the arc voltage of the torch from the driver in the electrical height control feedback circuit.

7. A cutting system as claimed in claim 1 wherein the cutting torch is coupled to the controller by a universal wiring harness including a resistance voltage divider connected to reduce the amount of the arc voltage of the cutting torch applied to the controller to a safe level.

8. A cutting system as claimed in claim 1 wherein the controller is designed to sense when the plasma cutting torch begins cutting and to delay horizontal movement of the X-axis reciprocal driver and the Y-axis reciprocal driver for a preselected time delay.

9. A cutting system as claimed in claim 8 including logic interface circuitry and software coupled to the electrical feedback circuit and to the X-axis reciprocal driver and the Y-axis reciprocal driver, the logic interface circuitry and software stopping the X-axis reciprocal driver and the Y-axis reciprocal driver whenever the electrical feedback circuit loses a feedback signal.

10. A cutting system as claimed in claim 1 including logic interface circuitry and software coupled to the electrical feedback circuit, the logic interface circuitry and software including controls for prescribing any horizontal cutting path on the work piece and controls turning off the height control feedback circuit when the torch is moved over an area the logic interface circuitry and software has already designated to be cut.

11. A cutting system as claimed in claim 1 wherein the electrical height control feedback circuit includes adjustable maximum and minimum arc voltage settings incorporated into the feedback circuit for determining when the torch is cutting.

12. A cutting system comprising:
    a plasma cutting torch reciprocally movable relative to a work piece along a Z-axis generally perpendicular to the work piece, the torch being connectable to a power source and providing an arc voltage during cutting, the arc voltage being proportional to a distance between the torch and the work piece;
    an electrically operable driver connected to the plasma cutting torch for reciprocally moving the plasma cutting torch along the Z-axis;
    a computer and associated circuitry including controls for selecting a height of the plasma torch relative to the work piece, the selected height having a tolerance extending above and below the selected height and within a range of zero inches to greater than 0.029 inches, a climb zone above the tolerance, a dive zone below the tolerance, and selected rates of driver speed within the climb zone and the dive zone, respectively; and
    an electrical height control feedback circuit connected to the plasma torch, the computer and associated circuitry, and the driver, the feedback circuit including sensor circuitry providing an electrical signal proportional to the arc voltage and an analog-to-digital converter for converting the proportional signal to a digital signal, the feedback circuit providing the digital signal to the computer and associated circuitry, and the computer and associated circuitry actuating the driver to move the plasma cutting torch to maintain the digital signal within a preset limit of a voltage indicative of the selected height.

13. A cutting system as claimed in claim 12 including optical isolators electrically separating the arc voltage of the torch from the driver in the electrical height control feedback circuit.

14. A cutting system as claimed in claim 12 wherein the electrical height control feedback circuit includes adjustable maximum and minimum arc voltage settings incorporated into the computer and associated circuitry for providing the feedback circuit a signal that the torch is cutting.

15. A method of controlling height of a plasma cutting torch relative to a work piece comprising the steps of:
    providing a plasma cutting torch, a work piece, a controller, and an electrically operable driver, the plasma cutting torch being reciprocally movable relative to the work piece along a Z-axis generally perpendicular to the work piece, and the electrically operable driver being connected to the plasma cutting torch for reciprocally moving the plasma cutting torch along the Z-axis;

connecting the torch to a power source providing an arc voltage during cutting, the arc voltage being proportional to a distance between the torch and the work piece;

introducing a minimum arc voltage setting and a maximum arc voltage setting into the controller;

selecting a height of the plasma cutting torch relative to the work piece;

measuring the arc voltage, comparing the measured arc voltage to the minimum arc voltage setting and the maximum arc voltage setting, and when the measured arc voltage is between the minimum arc voltage setting and the maximum arc voltage setting determining that the torch is cutting; and when the torch is determined to be cutting, activating the driver to move the plasma cutting torch in a direction to maintain the arc voltage so that the actual height is approximately the selected height.

16. A method as claimed in claim 15 wherein the step of selecting a height includes selecting a tolerance for the height, the tolerance extending above and below the selected height and within a range of zero inches to greater than 0.029 inches, and the step of activating the driver includes activating the driver only when the arc voltage indicates the height is outside of the selected tolerance.

17. A method as claimed in claim 16 wherein the step of selecting the height further includes selecting a climb zone between a maximum height of the selected tolerance and a height equivalent to the maximum arc voltage setting and selecting a dive zone between a minimum height of the selected tolerance and a height equivalent to the minimum arc voltage setting in which driver speed increases at a selected rate.

18. A method as claimed in claim 17 wherein the step of selecting the height further includes selecting a maximum climb speed greater than the selected rate of the driver for heights less than the climb zone and a maximum dive speed greater than the selected rate of the driver for heights greater than the dive zone.

19. A method as claimed in claim 15 wherein the step of measuring the arc voltage includes sensing a reduced voltage proportional to the arc voltage, converting the reduced voltage to a digital representation, and isolating the reduced voltage from the driver.

20. A method of controlling height of a plasma cutting torch relative to a work piece in a cutting system, the method comprising the steps of:

providing a plasma cutting torch, a work piece, and an electrically operable Z-axis driver, the plasma cutting torch being reciprocally movable relative to the work piece along a Z-axis generally perpendicular to the work piece, and the electrically operable Z-axis driver being connected to the plasma cutting torch for reciprocally moving the plasma cutting torch along the Z-axis;

providing an X-axis reciprocal driver and a Y-axis reciprocal driver and a controller including a microprocessor for moving the torch horizontally along any prescribed path on the work piece, coupling the controller to the electrical feedback circuit and to the X-axis reciprocal driver and the Y-axis reciprocal driver;

connecting the torch to a power source providing an actual arc voltage during cutting, the actual arc voltage being proportional to an actual distance between the torch and the work piece;

selecting a height of the plasma cutting torch relative to the work piece, the selected height being denoted by a representative arc voltage;

selecting a climb zone and a dive zone in which Z-axis driver speed increases at a selected rate and selecting a maximum climb rate greater than the selected rate and a maximum dive rate greater than the selected rate for Z-axis driver speed outside the climb zone and dive zone, respectively, to tune the cutting system for a fast response without creating an oscillation condition;

measuring the actual arc voltage including sensing the actual arc voltage and providing a reduced proportional voltage, converting the reduced proportional voltage to a digital signal proportional to a distance between the torch and the work piece, and using the digital signal to determine the amplitude of the actual arc voltage; and activating the Z-axis driver to move the plasma cutting torch in a direction to maintain the actual arc voltage approximately at the representative arc voltage denoting the selected height.

21. A method as claimed in claim 20 wherein the step of selecting a height includes selecting a tolerance for the height, the tolerance extending above and below the selected height and within a range of zero inches to greater than 0.029 inches, and the step of activating the Z-axis driver includes activating the Z-axis driver only when the arc voltage indicates the height is outside of the selected tolerance.

22. A method as claimed in claim 21 wherein the step of selecting the height further includes adjusting the selected height during cutting.

23. A method as claimed in claim 22 wherein the step of adjusting the selected height during cutting includes individually adjusting any of the steps of selecting a climb zone and a dive zone in which Z-axis driver speed increases at a selected rate and selecting a maximum climb rate greater than the selected rate and a maximum dive rate greater than the selected rate for Z-axis driver speed outside the climb zone and dive zone, respectively.

24. A method as claimed in claim 20 wherein the step of activating the Z-axis driver includes turning off the Z-axis driver when the torch is moved over an area the controller has already designated to be cut.

25. A method as claimed in claim 20 including a step of entering a maximum cutting signal and a minimum cutting signal and providing an indication that the torch is cutting when the measured actual arc voltage is between the maximum cutting signal and a minimum cutting signal.

26. A method as claimed in claim 25 including activating the X-axis reciprocal driver and a Y-axis reciprocal driver to move the torch horizontally along a prescribed path on the work piece, after receiving the indication that the torch is cutting.

27. A method as claimed in claim 26 including a step of introducing a time delay in the microprocessor and delaying the activating of the X-axis reciprocal driver and the Y-axis reciprocal driver, after receiving the indication that the torch is cutting, by the time delay.

* * * * *